United States Patent

Watanabe et al.

[11] Patent Number: 6,054,508
[45] Date of Patent: Apr. 25, 2000

[54] WATER DISPERSIBLE RESIN COMPOSITION AND PROCESS FOR PRODUCING THE SAME

[75] Inventors: Masakazu Watanabe, Toyonaka; Hiroshi Miwa, Ibaraki; Teruaki Kuwajima, Shijonawate; Satoshi Suzuki, Higashiosaka, all of Japan

[73] Assignee: Nippon Paint Co., Ltd., Osaka, Japan

[21] Appl. No.: 08/765,049

[22] PCT Filed: Jul. 6, 1995

[86] PCT No.: PCT/JP95/01351

§ 371 Date: Oct. 24, 1997

§ 102(e) Date: Oct. 24, 1997

[87] PCT Pub. No.: WO96/01860

PCT Pub. Date: Jan. 25, 1996

[30] Foreign Application Priority Data

Jul. 7, 1994 [JP] Japan ..................... 6-155767

[51] Int. Cl.⁷ .................. C08K 3/20; C08L 63/02
[52] U.S. Cl. ............. 523/412; 427/410; 523/501; 524/832; 524/839; 524/845
[58] Field of Search ................. 523/412, 501; 428/413, 414, 412, 480, 482, 423.1, 500; 427/410; 524/832, 839, 845

[56] References Cited

U.S. PATENT DOCUMENTS

| | | | |
|---|---|---|---|
| 4,916,181 | 4/1990 | Maska et al. | 524/457 |
| 5,015,688 | 5/1991 | Bederke et al. | 524/600 |
| 5,034,275 | 7/1991 | Pearson et al. | 428/336 |
| 5,114,993 | 5/1992 | Scherping et al. | 523/409 |
| 5,322,865 | 6/1994 | Inoue et al. | 524/501 |

*Primary Examiner*—Robert Dawson
*Assistant Examiner*—D. Aylward
*Attorney, Agent, or Firm*—Wenderoth, Lind & Ponack, L.L.P.

[57] ABSTRACT

A method for producing a water dispersible resin composition, comprising radically polymerizing, in the presence of a polymerization initiator, a starting mixture comprising (a) 10 to 95% by weight of a water insoluble resin having a solubility in water of not more than 1; and (b) 5 to 90% by weight of a monomer mixture which comprises (1) 2 to 75% by weight of an ethylenically unsaturated monomer having an acid group, and (2) 25 to 98% by weight of an ethylenically unsaturated monomer other than (1); and neutralizing the resulting resin composition containing an acid group by adding a neutralizing agent. A coating composition is provided which is stable and excellent in coating workability and has improved storage stability and solid components content of the coating composition. Since particles excellent in dispersibility improve the uniformity of a coated film, transparency, smoothness, chemical resistance, water resistance and mechanical strength of the coated film are also improved.

20 Claims, 1 Drawing Sheet

WATER DISPERSIBLE RESIN COMPOSITION AND PROCESS FOR PRODUCING THE SAME

This application is a 371 application of International Application No. PCT/JP95/01351, filed Jul. 6, 1995.

Industrial Field

The present invention relates to a water dispersible resin composition, particularly a water dispersible resin composition which can be suitably used for a coating composition.

Prior Art

A coating composition generally comprises a coloring agent such as a dye and pigment, a binder which fixes the coloring agent to a surface to be coated, and a liquid medium for making a uniform coated film. The binder is generally water insoluble, since they are a high-molecular weight polymer or resin, and an organic solvent such as a thinner has been primarily used as a liquid medium for a coating composition which contains such a water insoluble binder.

Recently, however, a waterborne coating composition is highly desired which makes no bad influence on the environment and is not harmful for workers. Many water soluble or water dispersible coating compositions have been reported so far, however, the water soluble coating composition has a defect that it is essentially inferior in water resistance and the water dispersible coating composition has a defect that the coating composition thereof is inferior in stability.

The reason of the bad stability of the water dispersible coating composition mainly consists in poor stability of the water dispersible resin composition which is used for the water dispersible coating composition.

For example, Japanese Patent Kokai Publication No. 47029/1977 discloses a water dispersible resin composition obtained by neutralizing a copolymer obtained by polymerizing a mixture of alkoxymethylacrylamide, α,β-ethylenically unsaturated carboxylic acid and the other copolymerizable ethylenically unsaturated monomers in the presence of a waterborne resin. However, since compatibility between the water soluble resin and the copolymer is insufficient, the resulting resin composition is inferior in dispersed stability in water. Therefore, a coating composition obtained by using the resin composition is inferior in painting workability, and it is apt to sag. Further, the resulting coated film is inferior in transparency, smoothness, chemical resistance, water resistance and mechanical strength.

Further, Japanese Patent Kokai Publication 504138/1991 discloses a water dispersible resin composition obtained by polymerizing alternately (a) a monomer mixture comprising an acrylic monomer having a carboxyl group and (b) a monomer mixture comprising an acrylic monomer having a hydroxyl group, and by neutralizing them. However, this resin composition is inferior in dispersed stability in water due to insufficient compatibility between a polymer having acid value and a polymer having no acid value. Therefore, the coating composition comprising this resin composition does not show sufficient structural viscosity.

SUMMARY OF THE INVENTION

The present invention solves the above-described problems. The object thereof is to provide a water dispersible resin composition which can realize a waterborne coating composition which forms a coated film having excellent transparency, smoothness, chemical resistance, water resistance and mechanical strength, and which has excellent painting workability and dispersed stability, and to provide a method for producing the same.

The present invention provides a method for producing a water dispersible resin composition, comprising the steps of:

radically polymerizing, in the presence of a polymerization initiator, a starting mixture comprising (a) 10 to 95% by weight of a water insoluble resin having a solubility in water of not more than 1; and (b) 5 to 90% by weight of a monomer mixture which comprises of (1) 2 to 75% by weight of an ethylenically unsaturated monomer having an acid group, and (2) 25 to 98% by weight of the ethylenically unsaturated monomer other than (1); and neutralizing the resulting resin composition containing an acid group by adding a neutralizing agent. This method accomplishes the above-mentioned object.

DETAILED DESCRIPTION OF THE INVENTION

Figure 1:
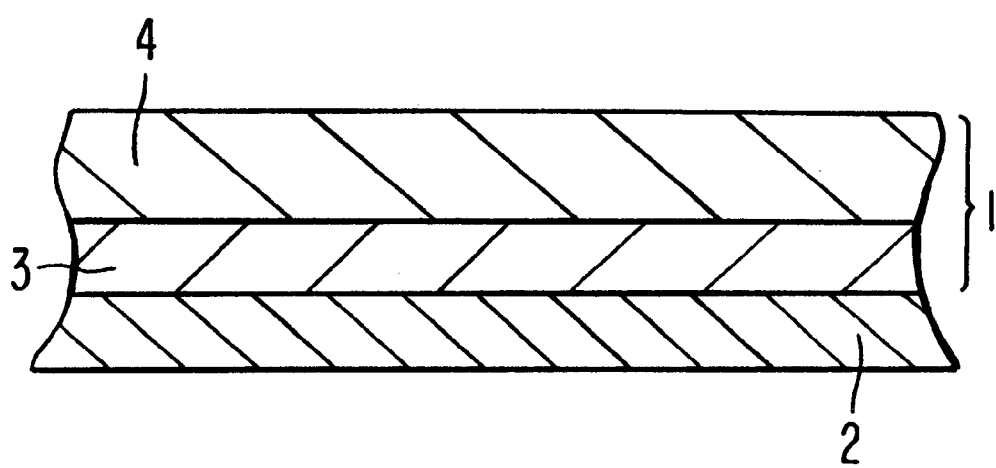
FIG. 1 is a sectional view which shows an example of a multi-layered coated film formed by using the resin composition of the present invention.

In a preferred embodiment of the method of the present invention, a water insoluble resin alone, preferably a solution obtained by dissolving the water insoluble resin in an organic solvent is first heated at approximately from 80 to 140° C. preferably from 90 to 120° C.

The water insoluble resin means a resin having a water solubility of not more than 1 g per 100 g of water. By using such a resin, it is possible to provide a coated film having excellent water resistance, chemical resistance and mechanical strength by comparison with those obtained by using a water soluble resin.

This water insoluble resin is not particularly limited to, but it should be non-volatile liquid at the polymerization temperature, and be a resin used as a binder for a coating composition by those skilled in the art. The water insoluble resin has a molecular weight of preferably from 300 to 100000, more preferably from 1000 to 50000, and has a hydroxyl value of preferably from 10 to 400, more preferably from 20 to 200. When the molecular weight is less than 300, the resin becomes volatile and may be lost by heating, and when more than 100000, the resin may not become liquid even at the polymerization temperature. Further, when the hydroxyl value is less than 10, curability of the resulting coated film may become poor, and when not less than 400, the resin may become water soluble.

The term "liquid" does not only mean that the water insoluble resin itself must be liquid at the polymerization temperature. It is included that the water insoluble resin is dissolved in a polymerization medium appropriately selected from various organic solvents to make liquid solution.

In general, there is preferably used a resin such as polyester, polyether, polycarbonate, polyurethane, epoxy resin or a mixture thereof in the present invention, and polycarbonate, polyurethane, epoxy resin or a mixture thereof is particularly preferred. It is because strength of a coated film increases when there exists in the resin a group which improves cohesive force such as an urethane bond, a carbonate bond and an oxirane ring.

The polyester is synthesized by polyesterification between polyol and polycarboxylic acid or acid anhydride. Preferably, it is synthesized by further using an acid component comprising long-chain fatty acid. The term "polyester" used herein includes what is called "alkyd resin".

Examples of the polyol include triols such as trimethylol propane and hexane triol, and diols such as propylene glycol, neopentyl glycol, butylene glycol, hexylene glycol, octylene glycol, 1,6-hexane diol, 1,8-octane diol, 1,9-nonane diol, 1,10-decane diol, 1,12-dodecane diol, 1,2-cyclohexane diol, 1,3-cyclohexane diol, 1,4-cyclohexane diol, hydrogenated bisphenol A, caprolactone diol and bishydroxyethyl taurine.

Particularly preferred are aliphatic diols such as neopentyl glycol, butylene glycol, hexylene glycol, octylene glycol, 1,6-hexane diol, 1,8-octane diol, 1,9-nonane diol, 1,10-decane diol and 1,12-dodecane diol. It is because these aliphatic diols have high flexibility, and a linear polyester chain is formed to provide a water dispersible resin composition excellent in pigment adsorptivity.

Examples of the polycarboxylic acid include aromatic dicarboxylic acids such as phthalic acid and isophthalic acid, aliphatic dicarboxylic acids such as adipic acid, azelaic acid and tetrahydrophthalic acid, and tricarboxylic acids such as trimellitic acid. Corresponding acid anhydrides are also preferably used. Examples of the long-chain fatty acid used include saturated fatty acids such as stearic acid and lauric acid, unsaturated fatty acids such as oleic acid and myristic acid,-and natural fats and oils such and castor oil, palm oil and soybean oil and modified oils thereof.

Preferred examples include dicarboxylic acids such as phthalic acid, isophthalic acid, phthalic anhydride, adipic acid, azelaic acid and tetrahydrophthalic acid, and particularly preferred examples include aliphatic dicarboxylic acids such as adipic acid and azelaic acid.

It is because these aliphatic dicarboxylic acids have high flexibility, and a linear polyester chain is formed to provide a water dispersible resin composition excellent in pigment adsorptivity.

Preferred polyester used in the present invention has a number average molecular weight of not less than 500, preferably from 1000 to 10000, more preferably from 1000 to 5000; a hydroxyl value of not more than 300, preferably from 10 to 200, more preferably from 20 to 100; and an acid value of not more than 15, preferably not more than 10, more preferably not more than 7. When the number average molecular weight of the polyester is less than 500, curability of the resulting water dispersible resin composition may become poor. When the hydroxyl value is more than 300, polymerization becomes non-uniform. Further, when the acid value is more than 15, water resistance of the resulting cured coated film becomes poor.

Examples of the polyether include alkylene oxide polymers such as ethylene oxide and propylene oxide, and the polyol adducts thereof. Examples of the polyol include triols such as trimethylol propane and hexane triol, and diols such as hydrogenated bisphenol A, caprolactone diol and bishydroxyethyl taurine.

As the polycarbonate, a resin obtained by the reaction between the carbonate selected from dialkyl carbonate and ethylene carbonate, and the alcohol selected from straight-chain dihydric alcohol, branched-chain dihydric alcohol and polyhydric alcohol having not less than two hydroxyl groups is preferred.

Specific examples of the branched-chain dihydric alcohol include aliphatic diols such as 2-methyl-1,3-propane diol, 3-methyl-1,5-pentane diol, neopentyl glycol, 2,2-diethyl-1, 3-propane diol, 2-butyl-2-ethyl-1,3-propane diol, 2-methyl-1,8-octane diol, 2,2,4-trimethyl-1,3-pentane diol, 2-ethyl-1, 3-hexane diol, 1,4-cyclohexane dimethanol, tricyclodecane dimethanol, 1,4-dihydroxyethylbenzene, 1,4-dihydroxyethyloxybenzene, bis(4-hydroxyethyloxyphenyl) propane and bis(4-(2-hydroxypropyl)oxyphenyl)propane, and bisphenols such as bisphenol A, bis(4-hydroxyphenyl) butane, bis(4-hydroxyphenyl)undecane and di(3-hydroxyphenyl)ether.

Specific examples of the polyhydric alcohol having not less than two hydroxyl groups include glycerol, trimethylolethane, trimethylolpropane, dimer of trimethylolpropane and pentaerythritol.

Specific examples of the straight-chain dihydric alcohol include 1,3-propylene glycol, 1,4-butane diol, 1,5-pentane diol, 1,6-hexane diol, 1,8-octane diol, 1,9-nonane diol, 1,10-decane diol and the like.

The polyurethane is obtained by reacting diol and diisocyanate. As the diol, polyether diol or polyester diol is generally used. Examples of such diol include the diols obtained by polymerization or copolymerization of alkylene oxides (ethylene oxide, propylene oxide, methylene oxide and the like) and/or heterocyclic ethers (tetrahydrofuran and the like), for example, polyethylene glycol, polypropylene glycol, polyethylene-propylene glycol, polytetramethylene ether glycol, polyhexamethylene ether glycol, polyoctamethylene ether glycol; polyethylene adipate, polybutylene adipate, polyhexamethylene adipate, polyneopentyl adipate, poly-3-methylpentyl adipate, polyethylene/butylene adipate, polyneopentyl/hexyl adipate; polylactone diol, for example, polycaprolactone diol, poly-3-methylvalerolactone diol; polycarbonate diol; or a mixture thereof, and diol having an acid group such as dimethylol propionic acid.

The isocyanate includes aliphatic diisocyanates, for example, hexamethylene diisocyanate, 2,2,4-trimethylhexane diisocyanate, lysine diisocyanate; alicyclic diisocyanate having 4 to 18 carbon atoms, for example, 1,4-cyclohexane diisocyanate, 1-isocyanato-3-isocyanatomethyl-3,5-trimethylcyclohexane(isophorone diisocyanate), 4,4'-dicyclohexylmethane diisocyanate, methylcyclohexylene diisocyanate, isopropylidenedicyclohexyl-4,4'-diisocyanate; modified compounds of these diisocyanates; and a mixture thereof. Among them, preferred examples include hexamethylene diisocyanate, isophorone diisocyanate, aromatic diisocyanate and the like.

Examples of the epoxy resin include glycidyl ethers such as ethylene glycol diglycidyl ether, propylene glycol diglycidyl ether, 1,6-hexane diol diglycidyl ether, preferably trimethylolpropane triglycidyl ether, bisphenol A-diglycidyl ether and hydrogenated bisphenol A-diglycidyl ether; glycidyl esters such as diglycidyl adipate, hydrogenated diglycidyl phthalate, diglycidyl phthalate and preferably triglycidyl trimellitate; and alicyclic epoxides such as 3,4-epoxycyclohexylmethyl-3,4-epoxycyclohexane carboxylate, bis-(3,4-epoxycyclohexyl) adipate and vinylcyclohexene dioxide. Commercially available products are also used such as ERL-4221, and 4299 (manufactured by UCC Corp.), Epolite 1600, and 4000 (manufactured by Kyoeisha Yushi K.K.) and Denacol EX-301, 622, 512, and 421 (manufactured by Nagase kasei K.K.). The epoxy resin may be a polymer.

The water insoluble resin is employed in an amount of from 10 to 95% by weight, preferably from 25 to 95% by weight and more preferably from 55 to 95% by weight based on the total amount of the starting mixture. When the amount of the water insoluble resin is less than 10% by weight, smoothness, chemical resistance and mechanical strength are not improved. When the amount of the water insoluble resin is more than 95% by weight, dispersed stability of the coating composition and curability of the coated film become poor.

Examples of the organic solvent which can be used as a polymerization medium include alcohols such as methanol, ethanol, isopropanol, ethoxy ethanol, ethoxy propanol and methoxy propanol, esters such as butyl acetate, methyl acetate and ethyl acetate, lactones such as 7-butyrolactone, hydrocarbons such as toluene and xylene, ethers such as dibutyl ether and ethylene glycol diethyl ether, and amides such as N-methyl pyrrolidone, and various compounds.

The organic solvent is used for regulating viscosity on polymerization, in an amount of from 10 to 400 parts by weight, preferably from 20 to 200 parts by weight based on 100 parts by weight of the starting mixture. When the amount of the organic solvent is less than 10 parts by weight, viscosity of the resin composition obtained by the polymerization becomes too high, and the polymerization does not progress uniformly. When the amount of the organic solvent is more than 400 parts by weight, the molecular weight becomes too low, and dispersed stability of the resulting resin composition becomes poor.

The monomer mixture is then added to the heated water insoluble resin or water insoluble resin solution, and the resulting starting mixture is polymerized in the presence of a polymerization initiator. The polymerization is preferably conducted for from 3 to 8 hours, particularly from 4 to 6 hours. In a preferred embodiment, the monomer mixture and the polymerization initiator are simultaneously added dropwise to the water insoluble resin solution over 1 to 5 hours, preferably 2 to 3 hours, then, the polymerization temperature is maintained for from 0 to 4 hours, preferably from 1 to 2 hours.

The monomer mixture used in the present Invention comprises ethylenically unsaturated monomer having an acid group and the other ethylenically unsaturated monomers. The ethylenically unsaturated monomer having an acid group is not particularly limited to, but it should give water dispersibility to the water insoluble resin by neutralization, and the monomer having up to 6 carbon atoms in the molecule is preferable. It is because when the monomer has more than 6 carbon atoms, hydrophilicity may not be obtained.

The ethylenically unsaturated monomer having an acid group which is preferably used in the present invention is the ethylenically unsaturated monomer having an carboxyl group, a sulfonic acid group or a phosphoric acid group. It is because such ethylenically unsaturated monomers have enough acidity which is required for giving water dispersibility to the resin.

Specific examples of the ethylenically unsaturated monomer having an carboxyl group include acrylic acid, methacrylic acid, maleic acid, crotonic acid, maleic acid, fumaric acid and itaconic acid and half esters thereof. ethyl maleate, ethyl fumarate, ethyl itaconate, mono(meth)acryloyloxyethyl succinate, mono(meth)acryloyloxyethyl phthalate, and a mixture thereof.

Specific examples of the ethylenically unsaturated monomer having a sulfonic acid group include acrylamide t-butylsulfonic acid, 3-sulfonylpropyl acrylate, 3-sulfonylpropyl methacrylate, bis(3-sulfonylpropyl) itaconate and the like.

Specific examples of the ethylenically unsaturated monomer having a phosphoric acid group include acid phosphoxyethyl methacrylate, acid phosphoxypropyl methacrylate, acid phosphoxy 3-chloropropyl methacrylate and the like.

The ethylenically unsaturated monomer having an acid group is used in an amount of from 2 to 75% by weight, preferably from 4 to 75% by weight, more preferably from 15 to 50% by weight based on the total amount of the monomer mixture. When the amount of the ethylenically unsaturated monomer having an acid group is less than 2% by weight, dispersibility becomes poor, and when more than 75% by weight, polymerization may not progress uniformly.

The other ethylenically unsaturated monomer is not particularly limited to, but it should not disturb the water dispersibility given to the water insoluble resin by the acid group containing monomer, and should exist together with the acid group. An ethylenically unsaturated monomer having an amide group is preferred. The ethylenically unsaturated monomer having an amide group preferably has up to 12 carbon atoms in the molecule. When the monomer has more than 12 carbon atoms, hydrophilicity is not given to the resin adequately.

Specifically, (meth)acrylamides are used such as acrylamide, methacrylamide, N-isopropylacrylamide, N-butylacrylamide, N,N-dibutylacrylamide or hydroxymethylacrylamide, methoxymethylacrylamide and butoxymethylacrylamide. The preferred (meth)acrylamides are acrylamide, methacrylamide and a mixture thereof.

The ethylenically unsaturated monomer having an amide group is used in an amount of from 1 to 50% by weight, preferably from 10 to 30% by weight based on the total amount of the monomer mixture. When the amount of the ethylenically unsaturated monomer having an amide group is less than 1% by weight, dispersibility becomes poor, and when more than 50% by weight, polymerization may not progress uniformly.

The other ethylenically unsaturated monomer is not particularly limited to, but it should not disturb the water dispersibility of the acid group-containing resin composition obtained after polymerization. For example, an ethylenically unsaturated monomer having a hydroxyl group is included. By using such monomers, a hydroxyl group is introduced into the water dispersible resin composition of the present invention, and more excellent curability of the coated film is obtained.

Specific examples of such monomers include 2-hydroxyethyl acrylate, 2-hydroxyethyl methacrylate, 4-hydroxybutyl acrylate, 4-hydroxybutyl methacrylate and reaction products thereof with lactone.

The ethylenically unsaturated monomer having a hydroxyl group is used in an amount of from 5 to 60% by weight, preferably from 10 to 40% by weight based on the total amount of the monomer mixture. When the amount of the ethylenically unsaturated monomer having a hydroxyl group is less than 5% by weight, curability becomes poor, and when more than 60% by weight, polymerization may not progress uniformly.

The other ethylenically unsaturated monomers further include non-functional monomers such as styrene, α-methylstyrene, acrylate (for example, methyl acrylate, ethyl acrylate, butyl acrylate, and 2-ethylhexyl acrylate), and methacrylate (for example, methyl methacrylate, ethyl methacrylate, butyl methacrylate, isobutyl methacrylate, t-butyl methacrylate, 2-ethylhexyl methacrylate, and lauryl methacrylate).

The non-functional monomer is used in an amount of from 10 to 93% by weight, preferably from 30 to 90% by weight based on the total amount of the monomer mixture. When the amount of the non-functional monomer is less than 10% by weight, polymerization does not progress uniformly, and when more than 90% by weight, dispersibility becomes poor.

The above-described monomer mixture comprising the ethylenically unsaturated monomer having an acid group, the ethylenically unsaturated monomer having an amide group and the other ethylenically unsaturated monomers is used in an amount of from 5 to 90% by weight, preferably from 5 to 75% by weight, more preferably from 5 to 45% by weight.

The polymerization initiator used in the present invention is not particularly limited to, but it should be those usually used as a radical polymerization initiator, and examples thereof include organic peroxides such as benzoyl peroxide, t-butyl peroxide and cumene hydroperoxide, organic azo compounds such as azobiscyano valeric acid and azobisisobutyronitrile, and the like.

The acid group-containing resin composition obtained after completion of polymerization preferably has an acid value of from 5 to 200, particularly from 20 to 100, and a hydroxyl value of from 10 to 300, particularly from 20 to 200. When the acid value is less than 5, the composition becomes water insoluble, and when more than 200, polymerization progresses non-uniformly. Further, when the hydroxyl value is less than 10, curability becomes poor, and when over 300, dispersibility becomes poor. The acid value of the resin composition is regulated by controlling the amount of the monomer having an acid group, and the hydroxyl value is regulated by controlling the amount of the monomer having a hydroxyl group.

In a particularly preferred embodiment of the present invention, the acid group-containing resin composition is prepared by radically polymerizing, in the presence of a polymerization initiator, a starting mixture comprising (a) 55 to 95% by weight, preferably 65 to 95% by weight of polyester having a number average molecular weight of not less than 1000, a hydroxyl value of not more than 300 and an acid value of not more than 15; and (b) 5 to 45% by weight, preferably 5 to 35% by weight of a monomer mixture containing (1) 4 to 75% by weight, preferably 15 to 75% by weight of an ethylenically unsaturated monomer having a carboxyl group, and (2) 25 to 96% by weight, preferably 25 to 85% by weight of the ethylenically unsaturated monomer other than (1).

The polymerization can be conducted at a temperature of from 80 to 140° C., preferably from 90 to 120° C. for from 1 to 6 hours, preferably from 2 to 4 hours according to the conventional procedure known to the art. For example, to the above-mentioned polyester resin which has been regulated in viscosity by adding suitable amount of a solvent and heated, are added dropwise the monomer mixture and the polymerization initiator.

The solvent is used in an amount of not more than 100 parts by weight, preferably from 10 to 50 parts by weight based on 100 parts by weight of the polyester resin. When the amount of the solvent is more than 100 parts by weight, the molecular weight of the resulting acrylic polymer lowers, as a result, curability of the water dispersible resin composition becomes poor.

The solvent is not particularly limited to, but it should dissolve the polyester resin, and be a water miscible solvent having a boiling point of from about 60 to 250° C. The solvent suitably used includes tetrahydrofuran, ethanol, methanol, n-butanol, propanol, isopropanol, 2-butanol, t-butyl alcohol, dioxane, methyl ethyl ketone, ethylene glycol, ethylene glycol monobutyl ether, 2-methoxy propanol, 2-ethoxy propanol, 2-butoxy propanol, diethylene glycol monobutyl ether, N-methyl pyrrolidone, ethylene carbonate, propylene carbonate and the like.

Then, at least a part of the acid groups contained in the resin composition is neutralized by adding a neutralizing agent. By this procedure, the acid group-containing resin composition gives water dispersibility and the water dispersible resin composition of the present invention is obtained.

The neutralizing agent used in the present invention is not particularly limited to, but it should be those which is used by those skilled in the art for neutralizing the acid group contained in a waterborne or water dispersible resin composition, in preparing them, and the specific examples include organic amines such as monomethylamine, dimethylamine, trimethylamine, triethylamine, diisopropylamine, monoethanolamine, diethanolamine and dimethyl ethanolamine, inorganic bases such as sodium hydroxide, potassium hydroxide and lithium hydroxide, and the like.

The neutralizing agent can be used in the amount which is used by those skilled in the art for preparing a water dispersible resin having an acid functional group, generally in an amount of from 2 to 30% by weight, preferably from 5 to 20% by weight based on the resin solid components before the neutralization.

The water dispersible resin composition of the present invention obtained is well dispersed in a waterborne medium to form a stable dispersion. The waterborne medium means water or a mixed solution of water and a water miscible organic solvent. When the mixed solution of water and a water miscible organic solvent is used, water and the water miscible organic solvent are preferably blended in a proportion by weight of from 100/0 to 60/40, particularly 100/0 to 80/20 from the view point of reducing the amount of a volatile organic solvent contained in the composition. The preferred water miscible organic solvent includes the compounds described above as an organic solvent in the polymerization process.

A curing agent, pigment and the other additives known to those skilled in the art are blended to the resulted waterborne resin dispersion, to obtain a waterborne coating composition which shows good dispersed stability.

The curing agent is not particularly limited, but it should be a closslinking agent known to those skilled in the art for crosslinking a hydroxyl group or an acid group existing in the dispersed resin. It is preferred that at least one compound selected from the group consisting of an amino compound, an isocyanate compound and an epoxy compound.

Specific examples of the curing agent include blocked polyisocyanate, alkoxylated melamine-formaldehyde condensate (an alkoxylated compound of a condensate with melamine-formaldehyde or p-formaldehyde, for example, methoxymethylolmelamine, isobutoxylated methylolmelamine and butoxylated methylolmelamine), epoxy compound having more than one epoxy groups (for example, Epicoat 828, 1001 and 1004 manufactured by Shell Chemical Corp., Epolite 40 E, 400 E, #1600 and #721 manufactured by Kyoeisha Yushi Corp., Denacol EX-301, 622, 512 and 421 manufactured by Nagase Kasel Corp., and the like) and the like, and these may be mixed and used.

As the pigment, an inorganic pigment, an organic pigment and a metallic pigment (for example, an aluminium pigment) can be used in an suitable amount. Examples of the additive includes a UV absorbing agent, a defoaming agent, a surface regulating agent and the like. A polymer emulsion resin, a water soluble acrylic resin, polyester, an alkyd resin, and an epoxy resin, known to the art, can also be included in the waterborne coating composition of the present invention.

A multi-layered coated film having excellent appearance can be formed by using the waterborne coating composition of the present invention. An example of the preferred multi-layered coated film is shown in FIG. 1. In FIG. 1, a multi-layered coated film 1 is formed on an article to be coated 2 such as a car body. Though a base layer such as an electro-deposited layer and intermediate-coated layer is usually formed on the surface of the article to be coated 2, the base layer is not shown here.

The multi-layered coated film 1 is mainly composed of a base coated film 3 applied on the article to be coated 2 and a clear coated film 4 applied on the base coated film 3. The multi-layered coated film is preferably formed by the 2 coat/1 bake coating method in which a base coating composition is coated, a clear coating composition is coated thereon without curing the base coating composition, and the base coated film and the clear coated film are cured together.

The base coated film 3 is formed in a thickness of usually from 10 to 30 μm, preferably from 10 to 20 μm, according to a method known to those skilled in the art such as the brush coating, spray coating, electrostatic coating, flow coating, dip coating and roller coating by using the waterborne coating composition of the present invention comprising a pigment and the aforesaid usual additives. In order to obtain the multi-layered coated film 1 having excellent appearance, the base coated film 3 can optionally be treated before the clear coated film 4 is formed on it. The appearance of the multi-layered coated film 1 may be further improved, for example, by conducting what is called preheat treatment in which the formed base coated film 3 is heated at a temperature of from 50 to 100° C. for 2 to 3 minutes.

The clear coated film 4 is formed in a thickness of usually from 20 to 80 μm, preferably from 20 to 60 μm, by the same method as for the base coated film 3, by using, what is called a solvent-type or waterborne clear coating composition known to those skilled in the art. The clear coated film 4 is preferably formed by using the clear coating composition prepared by using the waterborne coating composition of the present invention.

When the clear coated film 4 is formed by using a waterborne clear coating composition, the problem of environmental pollution is difficult to occur, since there is no need to use a solvent for forming the multi-layered coated film 1. When the clear coating composition comprising the water dispersible resin composition of the present invention is used as the clear coating composition, workability of coating, appearance and adhesive property are further improved.

After forming the clear coated film 4, the base coated film 3 and the clear coated film 4 are cured to obtain the multi-layered coated film 1. The curing is carried out by heating at a temperature of from 100 to 200° C. for 15 to 60 minutes.

EXAMPLES

The following Examples further illustrate the present invention in detail but are not to be construed to limit the scope of the present invention. In the Examples, all "parts" are by weight unless otherwise stated.

Production Example 1

Preparation of Water Insoluble Polyester

To a 2 liter vessel equipped with a stirrer, nitrogen introducing tube, thermostat, condenser and decanter, were charged 136 parts of bishydroxyethyltaurine, 136 parts of neopentyl glycol, 274 parts of azelaic acid, 227 parts of phthalic anhydride and 27 parts of xylene, and the resulting mixture was heated. The generated water in the reaction was removed by conducting azeotropic distillation with xylene.

The temperature of the mixture was raised to 190° C. over about 2 hours from the start of the reflux, and stirring and dehydration were continued until the acid value corresponding to carboxylic acids reached 145, then the mixture was cooled to 140° C. Next, 274 parts of "Cardula E10" (glycidyl versatate manufactured by Shell Corp.) was added dropwise over 30 minutes with maintaining the temperature of the mixture at 140° C., then stirring was continued for 2 hours to complete the reaction. The resulted polyester has an acid value of 5, a hydroxyl value of 40 and a Mn of 2500. The solubility in water was not more than 1 g per 100 g of water.

Production Example 2

Preparation of Water Insoluble Polycarbonate

To a glass reaction vessel equipped with a fractionating column in addition to a stirrer and thermometer, were added 1000 parts (11.1 mol) of dimethyl carbonate, 650 parts (5.5 mol) of 3-methyl-1,5-pentanediol, and 1 part of tetraisopropyl titanate as a catalyst and they were mixed, and the resulting mixture was heated at 100° C. for 5 hours then heated up to 200° C. over 5 hours under atmospheric pressure to remove methanol generated by the reaction.

After completion of the distillation of methanol, reaction was conducted for further 2 hours under reduced pressure not more than 10 mmHg. To 500 parts of this reaction product was added 99 parts (0.40 mol) of trimethylolpropane dimer. The mixture was further reacted at 200° C. for 4 hours to obtain a polycarbonate resin (III) having a number average molecular weight of 2350 and a hydroxyl value of 154. The solubility in water was not more than 1 g per 100 g of water.

Production Example 3

Preparation of Water Insoluble Polyurethane Resin

To a 1000 ml reaction vessel equipped with a thermometer, stirrer and condenser, were added 10 parts of dimethylolpropionic acid, 40 parts of 1,4-butanediol and 250 parts of N-methylpyrrolidone and the resulting mixture was heated at 90° C. for dissolution. Then, 300 parts of isophorone diisocyanate and 400 parts of polypropylene glycol (molecular weight 1000) were added. The mixture was stirred for 10 minutes, then 1.03 parts of dibutyltin dilaurate was added. Next, the resulted mixture was heated up to 95° C., and reacted for 1 hour. The resulting reaction product has a molecular weight of 2000, an acid value of the solid components of 8.0 and a solubility in water of not more than 1 g per 100 g of water.

Example 1

To a 3 liter reaction vessel equipped with a nitrogen introducing tube, thermostat, dropping funnel, stirrer and condenser, were charged 500 parts of water insoluble polypropylene glycol (average molecular weight 3000, hydroxyl value 38, solubility in water of not more than 1 g per 100 g of water) and 300 parts of butyl diglycol solvent, and the resulting mixture was heated up to 100° C.

To the dropping funnel were charged a monomer mixture comprising 300 parts of styrene, 300 parts of methyl methacrylate, 261 parts of 2-ethylhexyl methacrylate, 139 parts of 2-hydroxyethyl methacrylate and 92 parts of methacrylic acid, and 30 parts of azobisisobutyronitrile initiator (AIBN). The solution composed of the monomer mixture and the initiator was dropped over 3 hours with maintaining the temperature at 100° C.

After completion of the dropping, the temperature was further maintained at 100° C. for 3 hours. An opaque and viscous resin solution was obtained by adding 96 parts of dimethyl ethanolamine and 1174 parts of deionized water and dissolving them. The resulted resin solution has a solid content of 50%, an acid value of the solid components of 40, and a hydroxyl value of 53.

This composition was diluted with deionized water so that the time measured with No.4 Ford cup at 20° C. was 30 seconds. The diluted resin solution was allowed to stand still for 10 days at 40° C., and dispersed state thereof was evaluated by visual inspection. There was observed uniform dispersion both at right after the dilution and after the storage stability test.

Examples 2 to 5

A resin solution was obtained in the same manner as in Example 1 except that the composition shown in Table 1 was used. The results are shown in Table 1.

TABLE 1

| Composition (parts) | Example 1 | Example 2 | Example 3 | Example 4 | Example 5 |
|---|---|---|---|---|---|
| Water insoluble resin | Polypropylene glycol 500 | Polyester of Production Example 1 500 | Polycarbonate of Production Example 2 500 | Polyurethane of Production Example 3 500 | Epolite 4000[1] 500 |
| Solvent | Butyl-diglycol 300 | 2-methoxy-propanol 300 | 2-methoxy-propanol 300 | None | Butyl diglycol 300 |
| Monomer mixture | | | | | |
| Styrene | 300 | 300 | 300 | 300 | 300 |
| Methyl methacrylate | 300 | 300 | 300 | 300 | 300 |
| 2-ethylhexyl methacrylate | 261 | 261 | 261 | 261 | 261 |
| 2-hydroxyexyl methacrylate | 139 | 139 | 139 | 139 | 139 |
| Methacrylic acid | 92 | 92 | 92 | 92 | 92 |
| Initiator | | | | | |
| AIBN | 30 | 30 | 30 | 30 | 30 |
| Neutralizing amine | | | | | |
| Dimethyl ethanolamine | 96 | | 96 | 96 | |
| Triethylamine | | 120 | | | 100 |
| Deionized water | 1174 | 1150 | 1174 | 1174 | 1170 |
| Acid value | 40 | 42 | 40 | 43 | 40 |
| Hydroxyl value | 53 | 54 | 91 | 40 | 40 |
| Solid content (%) | 50 | 49 | 50 | 46 | 50 |
| Dispersibility of resin solution | | | | | |
| Initial | Uniform | Uniform | Uniform | Uniform | Uniform |
| After storage stability test | Uniform | Uniform | Uniform | Uniform | Uniform |

[1]Epolite 4000 has a molecular weight of 340 and a solubility in water of not more than 1 g per 100 g of water.

Comparative Example 1

To a 3 liter reaction vessel equipped with a nitrogen introducing tube, thermostat, dropping funnel, stirrer and condenser, were charged 800 parts of 2-methoxypropanol, and the mixture was heated up to 100° C. To the dropping funnel were charged the same monomer mixture and the initiator as used in Example 1. The solution composed of the monomer mixture and the initiator was dropped over 3 hours with maintaining the temperature at 100° C.

After completion of the dropping, the temperature was further maintained at 100° C. for 3 hours. A clear and viscous resin solution was obtained by distilling 500 parts of the solvent off under reduced pressure and by dissolving the residue by adding 120 parts of triethylamine and 1150 parts of deionized water. To this was added 500 parts of the polyester prepared in Production Example 1, and they were dispersed uniformly to obtain a water dispersible resin composition.

This composition has a solid content of 49%, an acid value of the solid components of 42, and a hydroxyl value of 54.

This composition was diluted with deionized water so that the time measured with No.4 Ford cup at 20° C. was 30 seconds. The diluted resin solution was in uniformly dispersed right after the preparation, but after it was allowed to stand still for 10 days at 40° C., separation was observed.

Example 6

To a 3 liter reaction vessel equipped with a nitrogen introducing tube, thermostat, dropping funnel, stirrer and condenser, were charged 500 parts of water insoluble polypropylene glycol (average molecular weight 3000, hydroxyl value 38, solubility in water of not more than 1 g per 100 g of water) and 300 parts of butyl diglycol for solvent, and the resulting mixture was heated up to 100° C.

To the dropping funnel were charged a monomer mixture composed of 115 parts of styrene, 200 parts of butyl acrylate, 300 parts of 2-ethylhexyl methacrylate, 139 parts of 2-hydroxyethyl methacrylate, 46 parts of methacrylic acid and 200 parts of acrylamide, 400 parts of methoxypropanol solvent (MP) and azobisisobutyronitrile initiator (AIBN). The solution composed of the monomer mixture and the initiator was dropped over 3 hours with maintaining the temperature at 100° C.

After completion of the dropping, the temperature was further maintained at 100° C. for 3 hours. An opaque and viscous resin solution was obtained by distilling 400 parts of the solvent off under reduced pressure and by dissolving the residue by adding 47 parts of dimethyl ethanolamine and 1123 parts of deionized water. The resulted resin solution has a solid content of 50%, an acid value of the solid. components of 20, and a hydroxyl value of 53.

This composition was diluted with deionized water so that the time measured with No.4 Ford cup at 20° C. was 30 seconds. The diluted resin solution was allowed to stand still for 10 days at 40° C., and dispersed state thereof was evaluated by visual inspection. There was observed uniform dispersion both at right after the dilution and after the storage stability test.

Examples 7 to 10

A resin solution was obtained in the same manner as in Example 6 except that the composition shown in Table 2 was used. The results are shown in Table 2.

TABLE 2

| Composition (parts) | Example 6 | Example 7 | Example 8 | Example 9 | Example 10 |
|---|---|---|---|---|---|
| Water insoluble resin | Polypropylene glycol 500 | Polyester of Production Example 1 500 | Polycarbonate of Production Example 2 500 | Polyurethane of Production Example 3 500 | Epolite 4000[1] 500 |
| Solvent | Butyldiglycol 300 | 2-methoxypropanol 300 | 2-methoxypropanol 300 | None | Butyl diglycol 300 |
| Monomer mixture | | | | | |
| Styrene | 115 | 115 | 115 | 115 | 115 |
| Butyl acrylate | 200 | 200 | 200 | 200 | 200 |
| 2-ethylhexyl methacrylate | 300 | 300 | 300 | 300 | 300 |
| 2-hydroxyexyl methacrylate | 139 | 139 | 139 | 139 | 139 |
| Methacrylic acid | 46 | 46 | 46 | 46 | 46 |
| Acrylamide | 200 | 200 | 200 | 200 | 200 |
| Solvent | | | | | |
| MP | 400 | 400 | 400 | 400 | 400 |
| Initiator | | | | | |
| AIBN | 30 | 30 | 30 | 30 | 30 |
| Desolvation | 400 | 600 | 600 | 400 | 400 |
| Neutralizing amine | | | | | |

TABLE 2-continued

| Composition (parts) | Example 6 | Example 7 | Example 8 | Example 9 | Example 10 |
|---|---|---|---|---|---|
| Dimethyl ethanolamine | 47 | | 47 | 47 | 47 |
| Triethylamine | | 53 | | | |
| Deionized water | 1123 | 1217 | 1223 | 1123 | 1123 |
| Acid value | 40 | 42 | 40 | 43 | 40 |
| Hydroxyl value | 53 | 54 | 91 | 40 | 40 |
| Solid content (%) | 50 | 49 | 50 | 46 | 50 |
| Dispersibility of resin solution | | | | | |
| Initial | Uniform | Uniform | Uniform | Uniform | Uniform |
| After storage stability test | Uniform | Uniform | Uniform | Uniform | Uniform |

[1]Epolite 4000 has a molecular weight of 340 and a solubility in water of not more than 1 g per 100 g of water.

Comparative Example 2

To a 3 liter reaction vessel equipped with a nitrogen introducing tube, thermostat, dropping funnel, stirrer and condenser, were charged 800 parts of 2-methoxypropanol, and the mixture was heated up to 100° C. To the dropping funnel were charged the same monomer mixture, solvent and initiator as used in Example 2. The solution was dropped over 3 hours with maintaining the temperature at 100° C.

After completion of the dropping, the temperature was further maintained at 100° C. for 3 hours. A clear and viscous resin solution was obtained by distilling 600 parts of the solvent off under reduced pressure and by dissolving the residue by adding 96 parts of dimethyl ethanolamine and 1174 parts of deionized water. To this was added 500 parts of the polycarbonate resin in Production Example 2, and they were dispersed uniformly to obtain a water dispersible-resin composition.

This composition has a solid content of 50%, an acid value of the solid components of 40, and a hydroxyl value of 91.

This composition was diluted with deionized water so that the time measured with No.4 Ford cup at 20° C. was 30 seconds. The diluted resin solution was in uniformly dispersed state right after the preparation, and after it was allowed to stand still for 10 days at 40° C., separation was observed.

Comparative Example 3

To a 3 liter reaction vessel equipped with a nitrogen introducing tube, thermostat, dropping funnel, stirrer and condenser, were charged 800 parts of 2-methoxypropanol, and the mixture was heated up to 100° C. To the dropping funnel were charged the same monomer mixture, solvent and initiator as used in Example 2. The solution was dropped over 3 hours with maintaining the temperature at 100° C.

After completion of the dropping, the temperature was further maintained at 100° C. for 3 hours. Six hundred parts of the solvent was distilled off under reduced pressure, to this was added 500 parts of the polycarbonate resin in Production Example 1, then 47 parts of dimethyl ethanolamine and 1223 parts of deionized water were added to obtain a water dispersible resin composition.

This composition has a solid content of 50%, an acid value of the solid components of 40, and hydroxyl value of 91. This composition was diluted with deionized water so that the time measured with No.4 Ford cup at 20° C. was 30 seconds. The diluted resin solution was in uniformly dispersed state right after the preparation, and after it was allowed to stand still for 10 days at 40° C., separation was observed.

Comparative Example 4

To a 3 liter reaction vessel equipped with a nitrogen introducing tube, thermostat, dropping funnel, stirrer and condenser, were charged 500 parts of saccharose polyether polyol having a viscosity of about 6500 centipoise and a hydroxyl value of 325 (formed by reacting 1.0 mol of saccharose with 20.5 mol of propylene oxide; solubility in water is about 20 g per 100 g of water.) and 300 parts of dibutyl glycol, and the mixture was heated up to 100° C. To the dropping funnel were charged the same monomer mixture, solvent and initiator as used in Example 2. The solution was dropped over 3 hours with maintaining the temperature at 100° C .

After completion of the dropping, the temperature was further maintained at 100° C. for 3 hours. An opaque and viscous resin solution was obtained by distilling 400 parts of the solvent off under reduced pressure and by dissolving the residue by adding 47 parts of dimethyl ethanolamine and 1123 parts of deionized water. The resulted resin solution has an acid value of the solid components of 20, and a hydroxyl value of 148.

This composition was diluted with deionized water so that the time measured with No.4 Ford cup at 20° C. was 30 seconds. The diluted resin solution was in uniformly dispersed state right after the preparation, and after it was allowed to stand still for 10 days at 40° C., separation was observed.

Example 11

To 100 parts of the water dispersible resin composition obtained in Example 1 were added 5 parts of Cymel 303 (methoxylated methylol melamine manufactured by Mitsui Toatsu Corp.) and 15 parts of Uban 20 N-60 (butylolated melamine manufactured by Mitsui Toatsu Corp.) and they were uniformly mixed. Then, 0.5 parts of p-toluenesulfonic acid (PTS)(40% ethanol solution) was added, they were uniformly mixed, and the resulted mixture was diluted with deionized water so that the time measured with No.4 Ford cup at 20° C. was 30 seconds.

The resulted solution was coated by a roll coater on a substrate to form a 30 μm thick layer, and it was baked at 140° C. for 20 minutes to obtain a clear coated film. Separately, the diluted resin solution was allowed to stand still for 10 days at 40° C., and dispersed state thereof was evaluated by visual inspection. There was observed uniform dispersion both at right after the dilution and after the storage stability test.

Examples 12 to 20 and Comparative Examples 5 to 8

A resin solution was obtained and its dispersed stability was tested in the same manner as in Example 11 except that the compositions shown in Tables 3, 4 and 5 were used. The results are respectively shown in Tables 3, 4 and 5.

TABLE 3

| Composition (parts) | Example 11 | Example 12 | Example 13 | Example 14 | Example 15 |
|---|---|---|---|---|---|
| Water dispersible resin composition | Example 1 100 | Example 2 100 | Example 3 100 | Example 4 100 | Example 5 100 |
| Cymel 303 | 5 | 5 | 5 | 10 | 10 |
| Uban 20 N-60 | 15 | 15 | 15 | 10 | 10 |
| PTS | 0.5 | 0.5 | 0.5 | 0.8 | 0.8 |
| State of coated film | Clear | Clear | Clear | Clear | Clear |
| Dispersibility of resin solution | | | | | |
| Initial | Uniform | Uniform | Uniform | Uniform | Uniform |
| After storage stability test | Uniform | Uniform | Uniform | Uniform | Uniform |

TABLE 4

| Composition (parts) | Example 16 | Example 17 | Example 18 | Example 19 | Example 20 |
|---|---|---|---|---|---|
| Water dispersible resin composition | Example 6 100 | Example 7 100 | Example 8 100 | Example 9 100 | Example 10 100 |
| Cymel 303 | 5 | 5 | 5 | 10 | 10 |
| Uban 20 N-60 | 15 | 15 | 15 | 10 | 15 |
| PTS | 0.5 | 0.5 | 0.5 | 0.8 | 0.8 |
| State of coated film | Clear | Clear | Clear | Clear | Clear |
| Dispersibility of resin solution | | | | | |
| Initial | Uniform | Uniform | Uniform | Uniform | Uniform |
| After storage stability test | Uniform | Uniform | Uniform | Uniform | Uniform |

TABLE 5

| Composition (parts) | Comparative Example 5 | Comparative Example 6 | Comparative Example 7 | Comparative Example 8 |
|---|---|---|---|---|
| Water dispersible resin composition | Comparative Example 1 100 | Comparative Example 2 100 | Comparative Example 3 100 | Comparative Example 4 100 |
| Cymel 303 | 5 | 5 | 5 | 10 |
| Uban 20 N-60 | 15 | 15 | 15 | 10 |
| PTS | 0.5 | 0.5 | 0.5 | 0.8 |
| State of coated film | Opaque | Opaque | Opaque | Opaque |
| Dispersibility of resin solution | | | | |
| Initial | Uniform | Uniform | Uniform | Uniform |
| After storage stability test | Separated | Separated | Separated | Partial sedimentation |

Example 21

Preparation and Evaluation of Waterborne Metallic Coating Composition (1) Preparation of Waterborne Metallic Coating Composition To 15 parts of an aluminium pigment paste ("Alupaste 7160 N" manufactured by Toyo Aluminium Corp., Al metal content 65%) was added 30 parts of Cymel 303 (methoxylated methylol melamine manufactured by Mitsui Toatsu Corp.) and they were uniformly mixed to obtain an aluminium pigment solution. To 140 parts of the water dispersible resin composition obtained in Example 2 was added the above-mentioned aluminium pigment solution and they were uniformly dispersed to obtain a waterborne metallic coating composition.

(2) Preparation and Evaluation of a Waterborne Clear/Waterborne Metallic Coated Test Piece.

An electrodeposited coated film having a thickness of 20 μm was formed on a degreased and burnished steel plate, by using an electrodeposition coating composition "Powertop u-100" manufactured by Nippon Paint Corp. On this electrodeposited coated film was coated an intermediate coating composition "Orga P-2 light gray" manufactured by Nippon Paint Corp. to give a 35μm thick layer, in an intermediate-coated film line, to obtain an intermediate-coated test piece. On the intermediate-coated test piece was coated the waterborne metallic coating composition prepared as described above by using an air spray in two-stage under the circumstances of a temperature of 23° C. and a humidity of 60%. The piece was preheated at 80° C. for 10 minutes, then the waterborne clear coating composition prepared in Example 18 was coated on the piece by using the same condition in two-stage coating of wet-on-wet method.

Then, the coated piece was baked at 140° C. for 30 minutes to obtain a waterborne clear/waterborne metallic coated test piece having a waterborne metallic coated film having a thickness of 20 μm on the intermediate-coated test piece and further having a waterborne clear coated film having a thickness of 30 μm on the waterborne metallic coated film. During the coating work, ease to occur sagging or pinholes of the waterborne metallic coating composition was evaluated as coating workability. Further, appearance of the resulted waterborne clear/waterborne metallic coated test piece was evaluated by visual inspection. Both results were excellent.

Then 10 cross-cuts having a width of 2 mm were made with a knife on the coated surface of the coated test piece, "Cellophane tape (24 mm)" manufactured by Nichiban Corp. was strongly adhered on the surface, then, the tape was quickly peeled off by pulling the end portion of the tape in a vertical direction, and the peeled state of the coated film was observed to evaluate adhesiveness of the coated film. No peeled fracture adhered on the adhesive surface of the tape was observed, and excellent adhesive property of the coated film was observed.

Example 22 and Comparative Example 9

A waterborne metallic coating composition was obtained and a waterborne clear/waterborne metallic coated test piece was made and evaluated in the same manner as in Example 21 except that the compositions shown in Table 6 was used. The results are shown in Table 6.

TABLE 6

| Composition (parts) | Example 21 | Example 22 | Comparative Example 9 |
|---|---|---|---|
| Water dispersible resin composition | Example 2 140 | Example 3 140 | Comparative Example 3 140 |
| Alupaste 7160N | 15 | 15 | 15 |
| Cymel 303 | 30 | 30 | 30 |
| Coating workability | Good | Good | Pinholes |
| Appearance of coated film | Good | Good | No good |
| Adhesiveness[1] | ○ | ○ | X |

[1] ○ indicates no peeling, X indicates some peeling.

Example 23

Preparation and Evaluation of Waterborne Metallic Coating Composition (1) Preparation of waterborne metallic coating composition A waterborne metallic coating composition was prepared in the same manner as in Example 21 except that the composition shown in Table 7 was used.

(2) Preparation of solvent-type clear coating composition

To the same apparatus as used in Production Example 1 were charged 57 parts of xylene and 6 parts of n-butanol, and 20 parts of the solution having the following composition:

| | | |
|---|---|---|
| Styrene | 30.0 | parts |
| Ethylhexyl methacrylate | 45.2 | parts |
| Ethylhexyl acrylate | 5.5 | parts |
| 2-hydroxyethyl methacrylate | 18.2 | parts |
| methacrylic acid | 3.1 | parts |
| Azobisisobutyronitrile | 4.0 | parts | was added and the resulting mixture was heated with stirring to raise its temperature. To the heated mixture was added dropwise the remaining 84 parts of the aforesaid mixed solution over 2 hours under reflux, then a solution comprising 0.5 parts of azobisisobutyronitrile, 23 parts of xylene and 14 parts of n-butanol was added dropwise over 20 minutes. The reaction solution was further stirred under reflux for 2 hours to complete the reaction to obtain an acrylic resin vanish having a non-volatile component content of 50% and a number average molecular weight of 3400. The hydroxyl value was 70.

One hundred parts of the obtained varnish and 16.7 parts of an isocyanate "Desmodur N-75" manufactured by Sumitomo Bayer Corp. were weighed and charged into a stainless vessel, and the mixture was stirred with a laboratory stirrer to obtain a solvent-type clear coating composition.

(3) Preparation and Evaluation of Solvent-type Clear/Waterborne Metallic Coated Test Piece An solvent-type clear/waterborne metallic coated test piece was prepared in the same manner as in Example 21 except that the above-described solvent-type clear coating composition was used instead of the waterborne clear coating composition obtained in Example 18. The resulted solvent-type clear/waterborne metallic coated test piece was irradiated with a fluorescent light of 30 W having a length of 30 cm from the position 2 m above the coated surface, and the image of the fluorescent light reflected on the coated surface was observed to evaluate smoothness of the coated film. The reflected image was not deformed, and the coated film shown excellent smoothness. Then, uniformity of appearance of the metallic coated film was evaluated by visual inspection according to the following evaluation standard.

5—uniform
4—slightly ununiform
3—partially ununiform
2—wholly ununiform
1—can not evaluate Examples 24 to 26 and Comparative Example 10

A waterborne metallic coating composition was obtained and a waterborne clear/waterborne metallic coated test piece was made and evaluated in the same manner as in Example 23 except that the compositions shown in Table 7 was used. The results are shown in Table 7.

TABLE 7

| Composition (parts) | Example 23 | Example 24 | Example 25 | Example 26 | Comparative Example 10 |
| --- | --- | --- | --- | --- | --- |
| Water dispersible resin composition | Example 7 140 | Example 8 140 | Example 9 150 | Example 10 140 | Comparative Example 3 140 |
| Alupaste 7160 N | 15 | 15 | 15 | 15 | 15 |
| Cymel 303 | 30 | 30 | 30 | 30 | 30 |
| Appearance of coated film | Good | Good | Good | Good | No good |
| Uniformity | 3 | 4 | 4 | 4 | 2 |

Example 27

Preparation and Evaluation of Waterborne Solid Coating Composition (1) Preparation of Waterborne Resin Varnish To a 2 liter reaction vessel equipped with a stirrer, thermostat and decanter, were charged 273 parts of tall oil fatty acid, 197 parts of trimethylolpropane, 78 parts of neopentyl glycol, 91 parts of hydrogenated bisphenol A, 204 parts of isophthalic acid, 157 parts of trimellitic anhydride and 20 parts of xylene, and the mixture was heated with stirring. The reaction was continued for 5 hours with removing the generated water maintaining the reaction temperature from 180 to 210° C. to obtain an alkyd resin having an acid value of 65, a hydroxyl value of 100, a number average molecular weight of 1500, and an oil length of 30. Then, 183 parts of ethylene glycol monobutyl ether and 96 parts of dimethyl ethanolamine were added, and the mixture was diluted with deionized water to obtain a waterborne varnish having a non-volatile content of 50%.

(2) Preparation of Pigment Paste

The above-mentioned waterborne resin varnish (160 parts), 320 parts of Taypake R-820 (rutile-type titanium oxide pigment manufactured by Ishihara Industry Corp.) and 78 parts of deionized water were weighed and charged into a 1.5 liter stainless vessel which can be sealed, to this was added 500 cc of a glass bead, and they were premixed with a stirrer, then the pre-mixture was mixed and dispersed for 2 hours by a coating composition conditioner to obtain a pigment paste.

(3) Preparation of Waterborne Solid Coating Composition

To a stainless vessel were charged 140 parts of the above-mentioned pigment paste, 140 parts of the water dispersible resin composition obtained in Example 2, 30 parts of Cymel 303 and 30 parts of Uban 20 N-60, and they were mixed by a stirrer at the room temperature to obtain a coating composition.

(4) Preparation and Evaluation of a Coated Test Piece

The obtained coating composition was diluted with deionized water so that the time measured with No.4 Ford cup was 30 seconds. On the same intermediate-coated test piece as used in Example 21, was coated this coating composition by using an air spray under circumstances of a temperature of 23° C. and a humidity of 60% to form 40, 50 and 60 μm thick layers. After setting for 15 minutes, each piece was baked at 150° C. for 15 minutes to obtain a cured coated film. Coating workability was evaluated by measuring pinhole critical coated thickness and sagging critical coated thickness of the coating composition. As a result, the pinhole critical coated thickness was 50 μm and the sagging critical coated thickness was 40 μm.

Here, the thicker the coated film is, the easier craters or pinholes on the coated surface occur. Further, the thicker the coated film is, the easier the sagging occurs. Therefore, commercial value of the coating composition is high when the pinhole critical coated thickness and the sagging critical coated thickness are larger.

Next, appearance of the coated surface was evaluated by measuring gloss of the coated surface using a digital deformation gloss meter manufactured by Suga test machine Corp. The gloss at 60 was not less than 90.

Further, on the intermediate-coated test piece was coated the coating composition in the aforesaid manner, and the piece was baked at 140° C. for 2 hours to obtain a cured coated film. On the surface of the resulting coated film was dropped 6 drops of butyl diglycol (BDG), and they were allowed to stand still for 24 hours. Solvent resistance of the coated surface was measured by observing the change of the coated surface. As a result, no change of the coated surface was observed, and excellent solvent resistance was shown.

Further, this cured coated film was immersed in hot water of 40° C. for 10 days. Water resistance of the coated surface was evaluated by observing the change of the coated surface. As a result, no change of the coated surface was observed, and excellent water resistance was shown.

Examples 28 and 29 and Comparative Example 11

A waterborne solid coating composition was obtained and a coated test piece was made and evaluated in the same manner as in example 27 except that the compositions shown in Table 8 was used. The results are shown in Table 8.

TABLE 8

| Composition (parts) | Example 27 | Example 28 | Example 29 | Comparative Example 11 |
|---|---|---|---|---|
| Pigment paste | 140 | 140 | 140 | 140 |
| Water dispersibile resin composition | Example 2 120 | Example 3 120 | Example 9 130 | Comparative Example 2 120 |
| Cymel 303 | 30 | 30 | 15 | 30 |
| Uban 20 N-60 | 30 | 30 | 45 | 30 |
| Critical thickness | | | | |
| Pinhole | ◎ | ◎ | ○ | Δ |
| Sagging | ○ | ◎ | ◎ | X |
| Gloss | ◎ | ◎ | ◎ | Δ |
| Solvent resistance | ○ | ○ | ○ | X |
| Water resistance | ○ | ○ | ○ | X |

Evaluation standards
Pinhole critical coated thickness
◎ Not less than 50 μ
○ Not less than 40 μ
Δ 30 to 40 μ
X Not more than 30 μ
Sagging critical coated thickness
◎ Not less than 50 μ
○ Not less than 40 μ
Δ 30 to 40 μ
X Not more than 30 μ
Gloss (60° gloss)
◎ Not less than 90
○ Not less than 85
Δ 80 to 85
X Not more than 80
Solvent resistance and water resistance
○ No change
X Gloss is blurred or discolored Production Example 4

Production of Polyester Resin

To a 3 liter vessel equipped with a stirrer, nitrogen introducing tube, thermostat, condenser and decanter, were charged 876 parts of neopentyl glycol, 1160 parts of adipic acid and 30 parts of xylene, and the resulting mixture was heated. The generated water in the reaction was removed by azeotropic distillation with xylene.

The temperature of the mixture was raised to 200° C. over about 2 hours from the start of the reflux, stirring and dehydration were continued until the acid value corresponding to carboxylic acids reached 5, then the mixture was cooled to the room temperature. The resulted polyester resin has an acid value of 4.9, a hydroxyl value of 38 and a number average molecular weight of 3000.

Production Example 5

Production of Polyester Resin

To a 2 liter vessel equipped with a stirrer, nitrogen introducing tube, thermostat, condenser and decanter, were charged 498 parts of 1,6-hexane diol, 279 parts of isophthalic acid, 279 parts of azelaic acid, 30 parts of xylene and 1 part of DBTO (dibutyltin dilaurate), and the resulting mixture was heated. The generated water in the reaction was removed by azeotropic distillation with xylene.

The temperature of the mixture was raised to 240° C. over about 2 hours from the start of the reflux, stirring and dehydration were continued until the acid value corresponding to carboxylic acids reached 6, then the mixture was cooled to the room temperature. The resulted polyester resin has an acid value of 5.6, a hydroxyl value of 65 and a number average molecular weight of 1400.

Production Example 6

Production of Polyester Resin

To a 2 liter vessel equipped with a stirrer, nitrogen introducing tube, thermostat, condenser, decanter and dropping apparatus, were charged 160 parts of 1,6-hexane diol, 194 parts of neopentyl glyecol, 97 parts of phthalic anhydride, 400 parts of adipic acid and 30 parts of xylene, and the resulting mixture was heated. The generated water in the reaction was removed by azeotropic distillation with xylene.

The temperature of the mixture was raised to 200° C. over about 2 hours from the start of the reflux, stirring and dehydration were continued until the acid value reached 65, then the mixture was cooled to 140° C. "Cardular E10" (glycidyl versatate manufactured by Shell Corp.)(145 parts) was added dropwise over 30 minutes with maintaining the temperature at 140° C., then stirring was continued for 2 hours to complete the reaction. The resulted polyester resin has an acid value of 5.3, a hydroxyl value of 53 and a number average molecular weight of 2000.

Example 30

To a 1 liter vessel equipped with a stirrer, nitrogen introducing tube, thermostat, condenser and dropping funnel, were charged 300 parts of the polyester resin obtained in Production Example 4 and 100 parts of 2-methoxy propanol, and the resulting mixture was heated up to 90° C.

To the dropping funnel were charged a monomer mixture comprising 30 parts of styrene, 25 parts of ethyl acrylate, 15 parts of 2-hydroxyethyl methacrylate, 10 parts of butyl acrylate and 20 parts of methacrylic acid, and 3 parts of azobisisobutyronitrile. The monomer mixture and the initiator were dropped over 3 hours with maintaining the temperature at 90° C. After completion of the dropping, the temperature was further maintained at 90° C. for 2 hours.

Twenty two parts of dimethyl ethanolamine and 475 parts of deionized water were added to the mixture and they were dissolved to obtain an opaque and viscous waterborn resin solution.

The resulted resin solution has a solid content of 40%, an acid value of the solid components of 33, and a hydroxyl value of 45.

This composition was diluted with deionized water so that the time measured with No.4 Ford cup was 30 seconds, and the state of the composition after it was allowed to stand still for 10 days at 40° C., was evaluated by visual inspection to find that it was uniform.

Example 31

To a 1 liter vessel equipped with a stirrer, nitrogen introducing tube, thermostat, condenser and dropping funnel, were charged 250 parts of the polyester resin obtained in Production Example 5 and 100 parts of butyl diglycol, and the resulting mixture was heated up to 90° C.

To the dropping funnel were charged a monomer mixture comprising 20 parts of styrene, 25 parts of 2-ethylhexyl acrylate, 20 parts of 2-hydroxyethyl methacrylate, 10 parts of butyl acrylate and 25 parts of methacrylic acid, and 2 parts of azobisisobutyronitrile. The monomer mixture and the initiator were dropped over 3 hours with maintaining the temperature at 90° C. After completion of the dropping, the temperature was further maintained at 90° C. for 2 hours.

Twenty parts of triethylamine and 528 parts of deionized water were added to the mixture and they were dissolved to obtain an opaque and viscous waterborn resin dispersion.

The resulted resin solution has a solid content of 35%, an acid value of the solid components of 50, and a hydroxyl value of 70.

This composition was diluted with deionized water so that the time measured with No.4 Ford cup was 30 seconds, and the state of the composition after it was allowed to stand still for 10 days at 40° C., was evaluated by visual inspection to find that it was uniform.

Example 32

To a 2 liter vessel equipped with a stirrer, nitrogen introducing tube, thermostat, condenser and dropping funnel, were charged 500 parts of the polyester resin obtained in Production Example 6 and 100 parts of butyl diglycol, and the resulting mixture was heated up to 100° C.

To the dropping funnel were charged a monomer mixture comprising 20 parts of lauryl methacrylate, 25 parts of butyl acrylate, 20 parts of 2-hydroxyethyl methacrylate, 10 parts of methyl acrylate and 25 parts of methacrylic acid, and 3 parts of azobisisobutyronitrile. The monomer mixture and the initiator were dropped over 3 hours with maintaining the temperature at 100° C. After completion of the dropping, the temperature was further maintained at 100° C. for 3 hours.

Twenty eight parts of dimethyl ethanolamine and 469 parts of deionized water were added to the mixture and they were dissolved to obtain an opaque and viscous waterborn resin dispersion.

The resulted resin solution has a solid content of 50%, an acid value of the solid components of 32, and a hydroxyl value of 58.

This composition was diluted with deionized water so that the time measured with No.4 Ford cup was 30 seconds, and the state of the composition after it was allowed to stand still for 10 days at 40° C., was evaluated by visual inspection to find that it was uniform.

Comparative Example 12

To a 1 liter vessel equipped with a stirrer, nitrogen introducing tube, thermostat, condenser and dropping funnel, were charged 400 parts of 2-methoxypropanol, and the resulting mixture was heated up to 90° C.

To the dropping funnel were charged the same monomer mixture and initiator as used in Example 30. The monomer mixture and the initiator were dropped over 3 hours with maintaining the temperature at 90° C. After completion of the dropping, the temperature was further maintained at 90° C. for 2 hours. An opaque and viscous resin solution was obtained by distilling 300 parts of the solvent off under reduced pressure and by dissolving the residue by adding 22 parts of dimethyl ethanolamine and 475 parts of deionized water. To this was added 300 parts of the polyester resin obtained in Production Example 4, the mixture was uniformly mixed to obtain a waterborn resin dispersion. The resulted resin dispersion has a solid content of 40% an acid value of the solid components of 33, and a hydroxyl value of 45.

This composition was diluted with deionized water so that the time measured with No.4 Ford cup at 20° C. was 30 seconds, and was allowed to stand still for 10 days at 40° C., then, sedimentation of the solid components was observed by visual inspection.

Example 33

Preparation and Evaluation of Pigment Dispersion

The waterborn resin dispersion (250 parts) obtained in Example 30 was diluted with deionized water to regulate the viscosity to 1000 mPa's (cone-type viscometer, rotation rate: 1 rpm). To this were added 100 parts of a titanium oxide pigment ("CR-97" manufactured by Ishihara Industry Corp.) and 100 parts of a glass bead (diameter 2 mm), and the resulting mixture was dispersed for 30 minutes by a homodisper at a rotation rate of 2000 revolutions/minute.

Pigment dispersibility of the waterborn resin dispersion used was evaluated by testing opacifying ability of the resulted pigment dispersion and gloss of the coated film formed. A pigment dispersion in which a pigment is well dispersed shows more excellent opacifying ability and gloss.

First, the pigment dispersion was coated on an opacifying ability testing paper having white and black cells of 2 cm square by using a doctor blade so that dried coated thickness was 40μm, and the coated composition was dried at 150° C. for 30 minutes. The cells of the opacifying ability testing paper were completely hidden and could not see through. The gloss (200 gloss) of the coated surface was 85.

Example 34

A pigment dispersion was obtained in the same manner as in Example 33 except that the waterborn resin dispersion obtained in Example 31 was used, and the opacifying ability and the gloss of the coated film were evaluated. The evaluation results are shown in Table 9.

Example 35

A pigment dispersion was obtained in the same manner as in Example 33 except that the waterborn resin dispersion obtained in Example 32 was used, and the opacifying ability and the gloss of the coated film were evaluated. The evaluation results are shown in Table 9.

Comparative Example 13

A pigment dispersion was obtained in the same manner as in Example 33 except that the resin solution obtained in Comparative Example 12 was used, and the opacifying ability and the gloss of the coated film were evaluated. The evaluation results are shown in Table 9.

TABLE 9

| Example No. | 33 | 34 | 35 | Comparative Example 13 |
|---|---|---|---|---|
| Resin dispersion | Example 30 | Example 31 | Example 32 | Comparative Example 12 |
| Opacifying | ◯ | ◯ | ◯ | X |
| Gloss | 85 | 80 | 87 | 25 |

Evaluation standards of Opacifying ability
◯: Cells of the opacifying ability testing paper were completely hidden and could not see through.
X: Cells of the opacifying ability testing paper were incompletely hidden and could see through.

As is clear from the results shown in Table 9, the pigment dispersion obtained by using the resin composition of the present invention has more excellent pigment dispersibility than the pigment dispersion obtained by using the resin composition of the Comparative Examples.

Effect of the Invention

The waterborn resin dispersion prepared by the method of the present invention has improved dispersed stability since a water insoluble resin and a polymer obtained by radical polymerization of a monomer mixture are dispersed in water in state that the resin is fully entangled with the polymer. Also, therefore, when the waterborn resin dispersion is prepared as a coating composition, an additive such as a curing agent can be stably took into the dispersed particles.

As a result, storage stability and solid components content of a coating composition are improved, and there is obtained a coating composition which is stable and excellent in coating workability. Further, since particles excellent in dispersibility improve the uniformity of a coated film, transparency, smoothness, chemical resistance, water resistance and mechanical strength of the coated film are also improved.

What is claimed is:

1. A method for producing a water dispersible resin composition, comprising:

radically polymerizing, in the presence of a polymerization initiator, a starting mixture comprising (a) 10 to 95% by weight of a water insoluble rein, having a solubility in water of not more than 1 and being a non-volatile liquid at a polymerization temperature; and (b) 5 to 90% by weight of a monomer mixture which comprises (1) 2 to 75% by weight of an ethylenically unsaturated monomer having an acid group, and (2) 25 to 98% by weight of an ethylenically unsaturated monomer other than (1); and neutralizing the resulting resin composition containing an acid group by adding a neutralizing agent.

2. The method according to claim 1, wherein the ethylenically unsaturated monomer other than (1), comprises 1 to 50% by weight based on the monomer mixture of an ethylenically unsaturated monomer having an amide group.

3. The method according to claim 1, wherein said monomer mixture comprises (1) 4 to 75% by weight of an ethylenically unsaturated monomer having an carboxyl group and (2) 25 to 96% by-weight of the ethylenically unsaturated monomer other than (1).

4. The method according to claim 1, wherein said water insoluble resin is at least one selected from the group consisting of polyester, polyether, polycarbonate, polyurethane and epoxy resin having a molecular weight of not less than 300.

5. The method according to claim 1, wherein said water insoluble resin is at least one selected from the group consisting of polyester, polyether, polycarbonate, polyurethane and epoxy resin having a number average molecular weight of not less than 300 and a hydroxyl value of from 10 to 400.

6. The method according to claim 1, wherein said water insoluble resin is polyester having a number average molecular weight of not less than 500, a hydroxyl value of not more than 300 and an acid value of not more than 15.

7. A method for producing a water dispersible resin composition, comprising:

radically polymerizing, in the presence of a polymerization initiator, a starting mixture comprising (a) 55 to 95% by weight of polyester having a number average molecular weight of not less than 500, a hydroxyl value of not more than 300 and an acid value of not more than 15; and (b) 5 to 45% by weight of a monomer mixture consisting of (1) 4 to 75% by weight of an ethylenically unsaturated monomer having a carboxyl group, and (2) 25 to 96% by weight of the ethylenically unsaturated monomer other than (1); and neutralizing the resulting resin composition containing a carboxyl group by adding a neutralizing agent.

8. The method according to claim 6 or 7, wherein said polyester has a number average molecular weight of not more than 10000.

9. The method according to claim 6, or 7, wherein said polyester has an acid value of not more than 10.

10. The method according to claim 6 or 7, wherein said polyester is prepared by using not less than 20% by weight of aliphatic diol.

11. A water dispersible resin composition obtained by any one method of claims 1 to 7.

12. A waterborn resin dispersion comprising the water dispersible resin composition of claim 11 and a waterborne medium.

13. A waterborne coating composition comprising the waterborne resin dispersion of to claim 12 and a curing agent.

14. The waterborne coating composition according to claim 13 further comprising a pigment.

15. A 2 coat/1 bake coating method in which a base coating composition is coated, a clear coating composition is coated thereon without curing the base coating composition, and the base coated film and the clear coated film are cured together, wherein said base coating composition is the coating composition of claim 14.

16. The coating method according to claim 15, wherein said clear coating composition is a solvent-type clear coating composition.

17. The coating method according to claim 15, wherein said clear coating composition is a waterborne clear coating composition.

18. A multi-layered coated film comprising a base coated film and a clear coated film, wherein said base coated film is formed by using the waterborne coating composition of claim 14.

19. The coating method according to claim 15, wherein said clear coating composition is a waterborne coating composition comprising a water dispersible resin composition, a waterborne medium and a curing agent, wherein said water dispersible resin composition is obtained by a method comprising:

radically polymerizing, in the presence of a polymerization initiator, a starting mixture comprising (a) 10 to 95% by weight of a water insoluble resin, having a solubility in water of not more than 1 and being a non-volatile liquid at a polymerization temperature; and (b) 5 to 90% by weight of a monomer mixture which comprises (1) 2 to 75% by weight of an ethylenically unsaturated monomer having an acid group, and (2) 25 to 98% by weight of an ethylenically unsaturated monomer other than (1); and neutralizing the resulting resin composition containing an acid group by adding a neutralizing agent.

20. The method according to claim 1, wherein said water insoluble resin is a polyester having a number average molecular weight of 1,000 to 10,000, a hydroxyl value of not more than 300 and an acid value of not more than 10.

* * * * *